July 5, 1938. E. T. HAGIST Re. 20,780

METER INSTALLATION

Original Filed Dec. 28, 1936 3 Sheets-Sheet 1

INVENTOR
EMIL T. HAGIST,
BY Louis Neeb
ATTORNEY

METER INSTALLATION
Original Filed Dec. 28, 1936 3 Sheets-Sheet 2
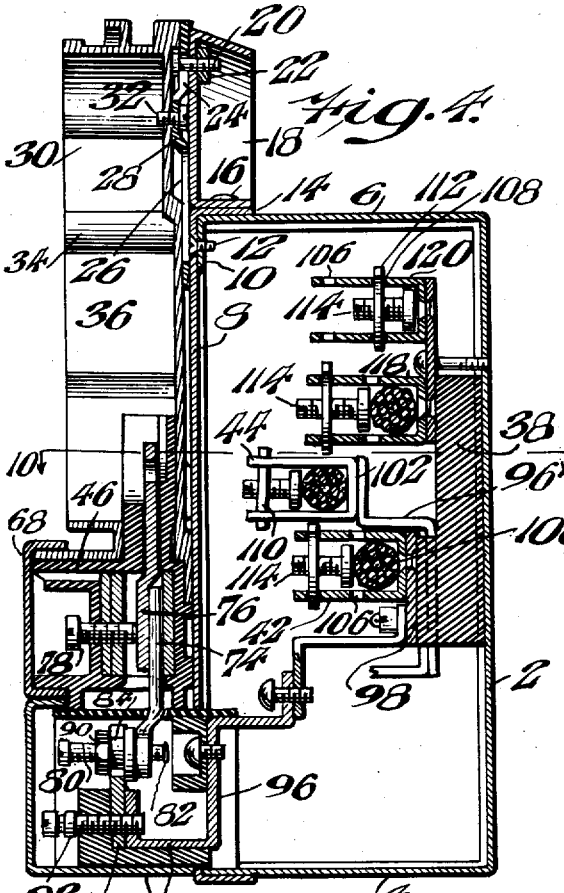
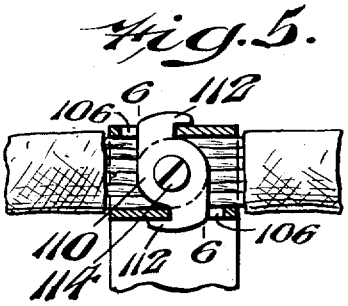
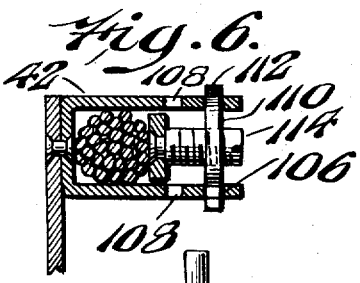
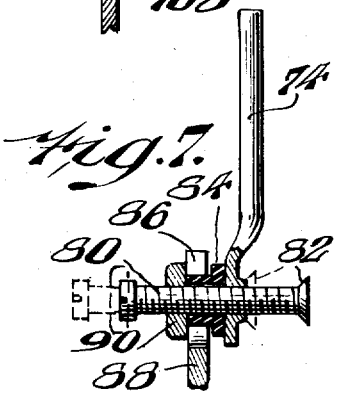
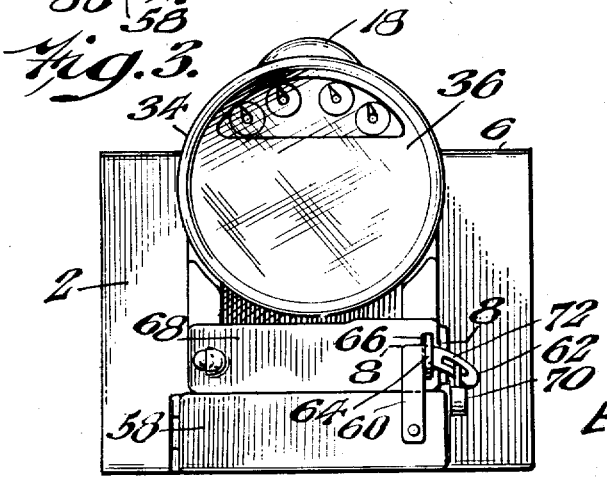
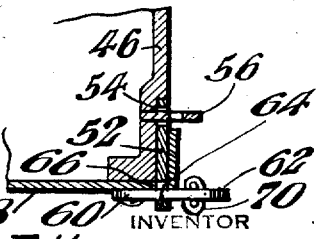
INVENTOR
EMIL T. HAGIST,
BY Louis Neeb
ATTORNEY July 5, 1938. E. T. HAGIST Re. 20,780
METER INSTALLATION
Original Filed Dec. 28, 1936 3 Sheets-Sheet 3
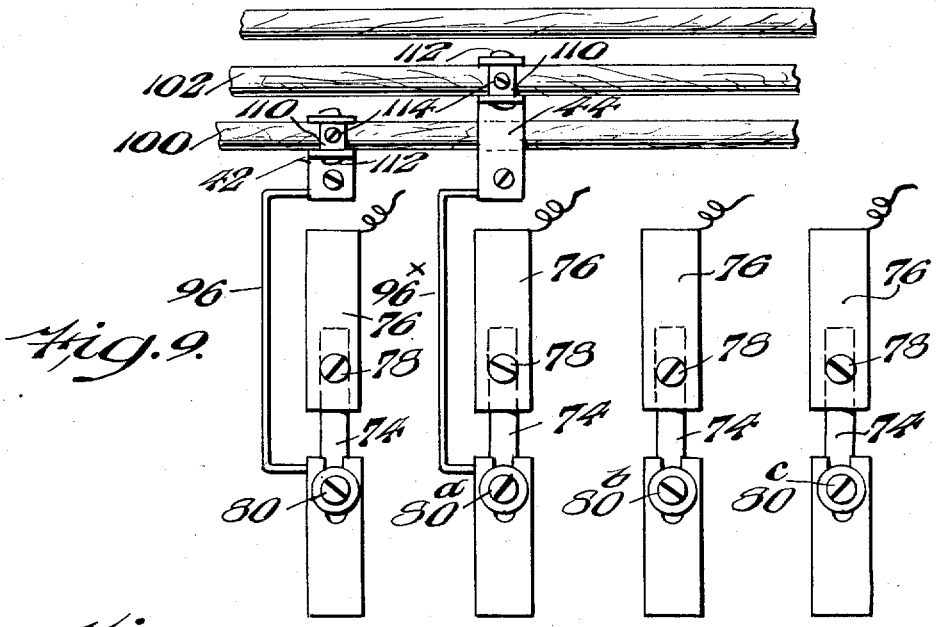
Fig. 9.
Fig. 10.
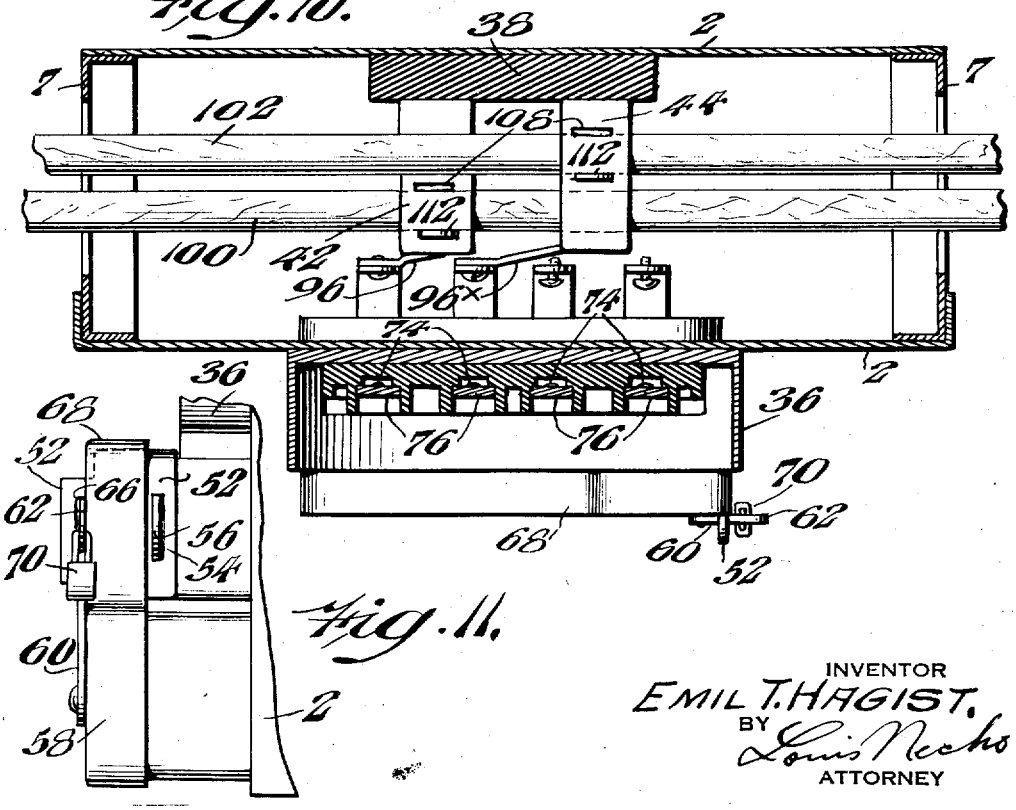
Fig. 11.
INVENTOR
EMIL T. HAGIST.
BY
Louis Neeb
ATTORNEY Reissued July 5, 1938

Re. 20,780

UNITED STATES PATENT OFFICE 20,780

METER INSTALLATION

Emil T. Hagist, Glenside, Pa.

Original No. 2,094,356, dated September 28, 1937, Serial No. 117,862, December 28, 1936. Application for reissue May 12, 1938, Serial No. 208,369

3 Claims. (Cl. 247—2)

My invention relates to a new and useful electric meter installation of the general type employed in measuring the amount of electrical energy consumed in industrial or domestic establishments.

As is well known, it is sometimes necessary to test the meter to ascertain whether or not it is running slow or fast, and it is most desirable that the testing of the meter be not permitted to interrupt the service to the user particularly in view of the use of many electrical appliances such as clocks, cooking ranges and the like, which would make any interruption in service, no matter how momentary, inconvenient.

It is also essential that an electric meter installation be such as to afford maximum ease and expediency in conducting the testing operation and to avoid the necessity of extensive disconnection or removing of parts before a test can be made.

It is also necessary that electric meter installations be such as to afford positive guarantee against "jumpering" of the circuit, that is, against the attempt of consumers to shunt the current around the meter and thus draw and use electrical energy without such energy passing through and being recorded on the meter.

With the above and other objects in view, my invention relates to a meter installation in which the meter itself, as well as a test block associated therewith, are mounted in a very accessible position on the front of the housing, commonly known as "channel".

My invention still further relates to a meter installation in which access to the test block can be had without removing or disconnecting the meter itself from the service lines, and without the necessity of opening the housing proper and exposing the "busses" or main feed lines.

My invention still further relates to a meter installation in which access to the interior of the channel, or to the busses extending therein or therethrough, can only be had after complete removal of the meter itself and the front cover on which it is mounted.

My invention still further relates to a meter installation including novel means for supporting, in an adjustable manner and on the same housing or channel, electric meters of various sizes.

My invention still further relates to an electric meter installation including novel means for effectively securing the busses in position and for making maximum and positive electrical contact.

My invention still further relates to a meter installation including novel means for expeditiously and effectively disconnecting the meter from the "load" without disconnecting the meter from the "service" line, all this being attained by the simple turning of a screw holding the contacts in question in or out of contacting position.

My invention still further relates to a meter installation which lends itself to an assembly involving a plurality of channels or housings positioned side by side in contiguous relationship with the "busses" or feed lines running through the whole row or bank of channels without any material alteration of the structure of any channel unit or housing.

Furthermore, it has heretofore been the general practice to install the electric meter proper through an opening in the top of the housing or channel with the load lines supplying the energy passing through the sides or bottom of the channel or housing. Recent developments have resulted in a construction in which the electric meter is positioned on the front face of the channel, said meter having backwardly extending prongs or contact elements which engage contact elements in the nature of "knife-switches", or the like, mounted within the channel and connected to the busses. At the present time there are many meters in existence representing huge investments which are not ready to be discarded in favor of the recent developments referred to and it is therefore an additional primary object of the present invention to produce a "conversion" housing or channel, that is, one which, while embodying all of the advantages of the front face mountings of the back-connected meters referred to, is nevertheless capable of receiving and supporting the millions of meters now in existence, pending their retirement, my novel channel or housing being capable of being adapted by a very slight change and with minimum effort, to serve in connection with the new type meter when the present day meters in existence may, without undue loss, be retired at some future date.

In the accompanying drawings:

Fig. 3 represents, on a reduced scale, a front elevation of a meter installation with the meter and the parts shown open in Fig. 1, being closed.

Fig. 4 represents a section, on an enlarged scale on line 4—4 of Fig. 2.

Fig. 5 represents a view partly in plan, and partly in section, showing one of my novel buss-retaining clamps forming part of my invention.

Fig. 6 represents a section on line 6—6 of Fig. 5.

Fig. 7 represents, on an enlarged scale, a view partly in section and partly in elevation of one of the contact elements for disconnecting the meter from the "load" lines during a testing of the meter.

Fig. 8 represents, on an enlarged scale, a section on line 8—8 of Fig. 3.

Fig. 9 represents a diagrammatic view showing the connection of the meter terminals to the service lines.

Fig. 10 represents a section on line 10—10 of Fig. 4.

Fig. 11 represents a right hand end view of Fig. 8.

Figure 1:
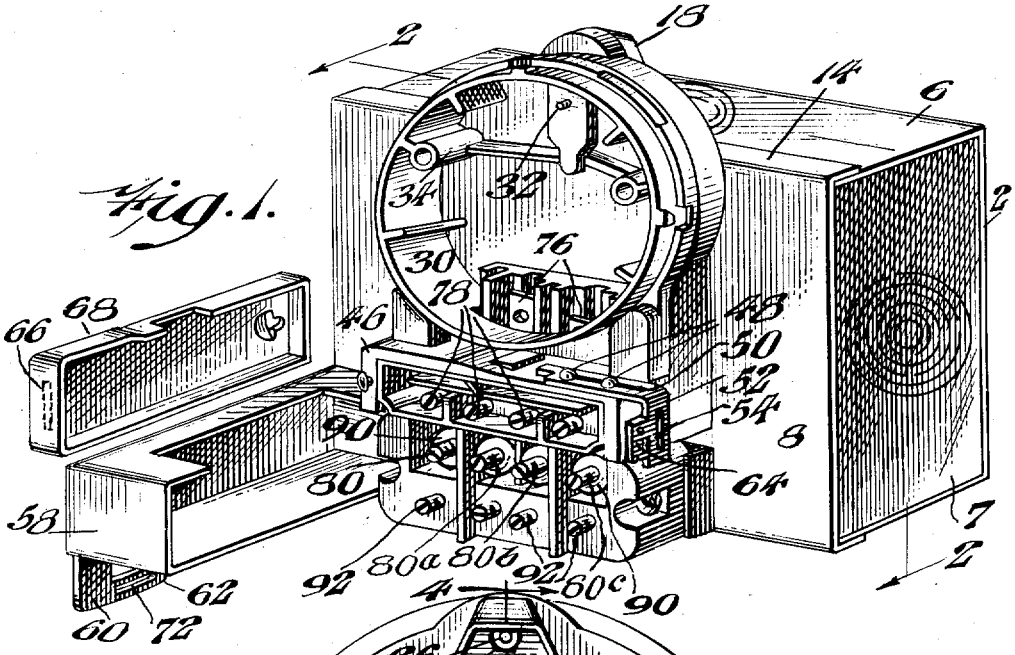
Fig. 1 represents a perspective front view of a meter installation embodying my invention, with meter elements removed and parts of the housing open.
Figure 2:
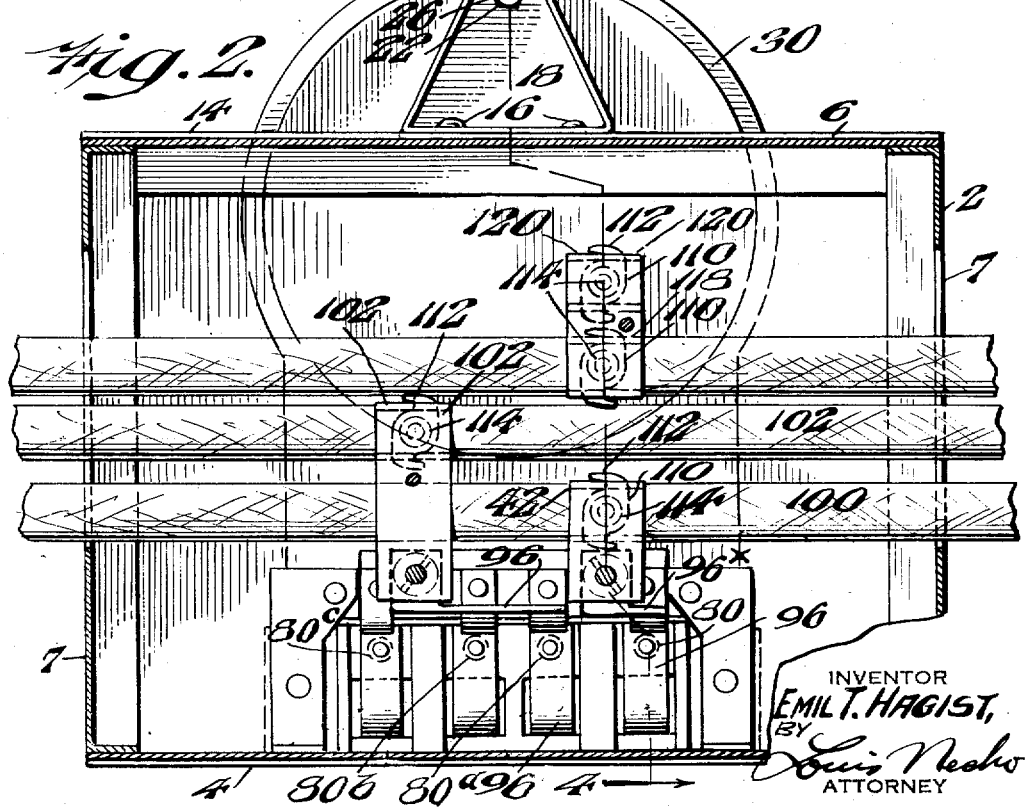
Fig. 2 represents, on an enlarged scale, a section on line 2—2 of Fig. 1.

Referring to the drawings in which like reference characters represent like parts and more particularly to Figs. 1 and 4 my novel installation comprises a channel or housing formed of the back wall 2, the bottom wall 4, the top wall 6, and walls 7 and the completely removable front face or cover 8, which is secured to a top lip or flange 10 by any means 12. The removable cover 8 is provided with the flange 14 to which is secured at 16 the bracket 18 from which projects the bolt or screw 20 held tight by the nut 22. The head of the bolt 20 is adapted to engage the upper or lower openings 24 and 26 in the connecting bracket 28 which is secured to the back of a meter shell or casing 30 by the screw 32. The meter shell or casing 30 is provided with the tapped lugs 34 which are adapted to receive suitable threaded elements for securing the meter proper 36 (shown only in Fig. 3) in position. Within the channel or housing is mounted a buss block 38 to which is secured the buss or service line retaining brackets 42 and 44. The meter casing 30 has a bottom housing extension 46 which carries the conventional contacts generally employed for delivering electrical energy from the service lines into the meter and for conducting the electrical energy from the meter to the load lines leading to the point of consumption. The extension housing 46 is provided with the top studs 48 which engage the slot 50 of the sliding bracket 52, the latter also having a slot 54 through which the slotted lug 56 on the side of the housing extension 46 projects. 58 designates a hinged cover which encloses a test block (hereinafter described) and has the pivoted latch 60 the deflected end 62 of which passes through the slotted keeper 64 after the latter has passed through the slot 66 in the removable cover 68 which encloses the meter terminals. A sealing mechanism such as the padlock 70, or the regular lead seal employed by utility companies in sealing the meter, is applied to the slot 72 in the deflected end 62 of the pivoted latch 60 thus completely sealing the testing block, the meter terminals, the meter and the entire channel against any unauthorized tampering. In order to test the meter it is merely necessary to break the seal 70 and disengage the deflected end 62 of the latch 60 from the slotted keeper 64 whereupon the hinged cover 58 which encloses the test block may be swung open, as shown in Fig. 1, without disturbing the meter or the removable cover 68. If access to the interior of the channel is desired, it will be necessary to remove the cover 68 in addition to opening the hinged cover 58 whereupon the meter casing or shell 30 together with its extension 46 and the meter elements can be removed in an upward direction as viewed in Figs. 1, 3 and 4, it being understood that the connecting bracket 28 has first been disengaged from the retaining screw 20. After the meter has been removed, the removable cover 8 can then be removed by disengaging a screw 12.

For testing a meter without interrupting the service it is desirable to provide means whereby the meter can be disconnected from the load lines leading to the point of consumption without being disconnected from the supply or service line, the current having been previously shunted around the meter to the load lines. After this is accomplished, a "phantom load" or any other desired standard is applied to test the speed of the meter in the conventional well known manner. In order to facilitate and minimize the time and effort in conducting a test, I have produced novel connecting devices, one of which is clearly illustrated in Fig. 7, and which comprises the terminal prong 74 which is clamped by the meter terminal contact plates 76 secured by the screw 78. Through the bottom end of the prong 74 passes the screw 80 the inner or rear end of which is provided with the stop 82. The screw 80 also passes through the insulating bushing 84, the reduced end of which fits in an opening 86 in the top of the bracket 88, the screw 80 being also provided with the fastening nut 90 which abuts against the upper portion of the bracket 88. The lower portion of the bracket 88 is secured by the screw 92 to the bottom end 94 of the contact element 96 which in turn is electrically connected through the plate 98 to the bracket 42 connecting with the buss or service line 100. The buss line 102 carried by the bracket 44 is connected to one of the meter terminals by the identical means and the identical manner just above described in connection with the buss line 100, such as the parts 96, 80, 74 and 78, etc. To break the electrical connection between either or both of the meter terminals and the busses 100 and 102, it is merely necessary to turn the screw 80 to the left thus withdrawing the nut 90 from contact with the bracket 88 and thus breaking the connection between the particular prong 74 and the source of electrical energy and hence deenergizing the particular meter terminal, all as shown in dotted lines in Fig. 7. The stop 82 prevents complete withdrawal of the screw 80.

Each of the brackets 42 and 44, which support and insure maximum contact with the busses 100 and 102, and one of which is clearly illustrated in Fig. 6, is formed of U-shape and has the openings 106 and 108. The buss is laid in the bottom of the U-shaped bracket and the clip 110, having the oppositely deflected hooked ends 112 and engaged by the inverted bolt 114, is placed on the buss in the manner shown. The clip 110, pivoted on the bolt 114, is pressed down until the hooked ends 112 thereof engage the upper or lower hole 106 or 108, according to the size of the buss, whereupon the turning of the inverted bolt 114 to the right results, first, in clamping the head of the bolt against the buss in the bracket, and second, in more firmly engaging the hooked ends 112 of the clip 110 with the walls of the respective opening 106 or 108 through which they are inserted thereby preventing the walls of the bracket 42 from spreading when the cable buss is compressed by the bolt 114. For a large buss the clip is engaged in the upper holes 106, as shown, and for a smaller one the clip is engaged in the lower holes 108, it being understood that the spacing and the number of holes in the U-shaped brackets can be varied at will.

If it is desired to use my novel channels or housings in a row to form a battery of installations, it is merely necessary to remove, or cut holes in, the end walls 7 and as many busses or service lines as may be needed are passed through the successive channels to be connected to the particular meter mounted on the particular channel. In the construction illustrated I have shown two additional buss-supporting brackets 118 and 120, it being understood that any desired number can be employed.

While in Fig. 4, I have illustrated, in vertical section, a connection of one of the meter terminals to one of the service or buss lines by means of the novel prong assembly illustrated in Fig 7, I have shown in Fig. 9 a diagrammatic view showing the four meter terminals with two terminals 80 and 80A connected to the busses 100 and 102 by means of the brackets 96 and 96x, and the other two terminals 80B and 80C not connected to the buss line, the terminals 80B and 80C being only connected to the load lines leading to the point of consumption so that the current enters the meter through the terminals 80 and 80A and emerges from the meter to the point of consumption through the terminals 80B and 80C. To electrically disconnect the meter from the busses 100 and 102 it is merely necessary to turn the screws 80 and 80A to the left to separate the contact 90 from the energized contact bracket 88. If, however, it is only desired to conduct a test, the current is shunted around the meter to insure uninterrupted service to the consumer and the meter may then be disconnected from the load lines leading to the point of consumption by turning to the left the corresponding screws 80B and 80C. This breaks the contact between the meter and the load lines but leaves the meter connected to the service lines. A "phantom load" or other standard is then applied to measure the amount of current passing through the meter and thus gage the accuracy of the meter.

It will thus be seen that I have produced a novel channel or housing in which I have greatly facilitated the operation of connecting and disconnecting the meter and that by my providing of buss-supporting brackets 42, 44, etc., I have greatly facilitated the fastening of the busses in place and greatly improved the electrical contact. It will also be seen that no access whatsoever to the terminals of the buss lines can be had without first breaking the seal thus insuring positively against the theft of current, and that by provision of the hinged cover 58 the test block is immediately exposed without disruption of service and without excessive dismantling or removal of the parts.

It is also to be noted that by making provision in my novel channel for mounting the meter on the face of the channel, I have devised a "conversion cabinet" which is adapted for use in connection with the present day meters which are normally applied to the housing through a hole in the top thereof, and that I have produced a cabinet for use in connection with the newly developed back-connected meter, since, in order to utilize this new type of meter, it is merely necessary to provide a hole in the front cover 8 of my improved channel and provide the usual switches within the channel.

While I have shown and described a meter installation particularly adapted for use in connection with the present day meters and also adapted for conversion for use in connection with the more modern back-connected meters, it is to be understood that the design may be varied in its details to accommodate any desired style of meter that may now or in the future be used.

Having thus described my invention, what I claim as new and desire to secure by Letters Patent is:

1. An electric meter installation comprising an open-faced trough, service lines disposed therein, a closure for the front of said trough, a meter assembly and a test block assembly, means for electrically connecting said assemblies to said service lines, and means for securing said assemblies on the outside of said closure, whereby said assemblies are rendered accessible without disturbing said trough or said closure.

2. An electric meter installation comprising a trough having an open front, service lines disposed therein, a closure for said open front having an aperture therein and constituting a support for meter and test block assemblies, means for securing said assemblies to the outside of said closure, and means for electrically connecting said assemblies to said service lines through said aperture, whereby said assemblies are rendered accessible without disturbing said trough or said closure.

3. In an electric meter installation adapted for use in conjunction with a bottom-connected or back-connected meter assembly, an open-faced pre-assembled trough having service lines disposed therein, a closure for the open face of such trough having an aperture therein, meter and test block assemblies, means for electrically connecting said assemblies to said service lines through said aperture, and means for securing said assemblies on the outside of said closure, whereby said bottom-connected and back-connected meter assemblies are rendered interchangeable without disturbing said trough.

EMIL T. HAGIST.